D. J. & J. E. GILES.
PROCESS OF EXTRACTING TUNGSTEN AND SIMILAR METALS FROM THEIR ORES.
APPLICATION FILED FEB. 11, 1918.
1,293,403.
Patented Feb. 4, 1919.
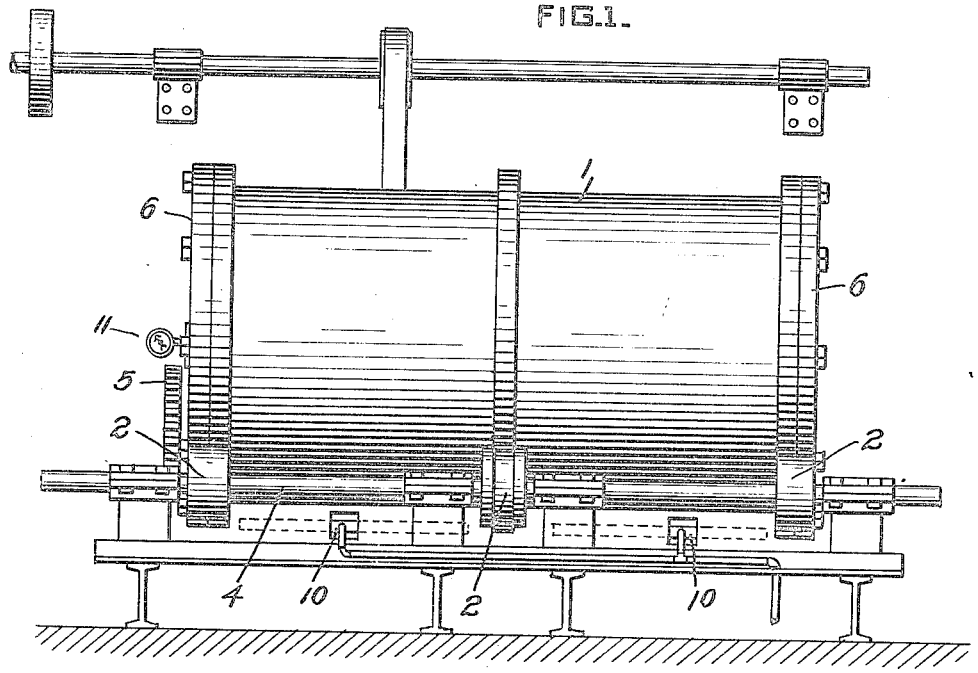
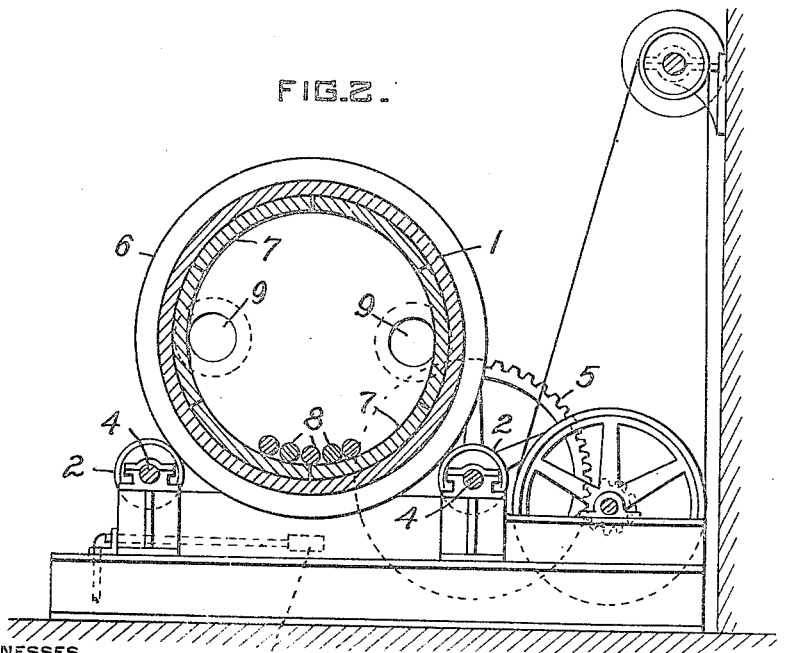

UNITED STATES PATENT OFFICE.

DAVID JOHN GILES AND JAMES EARL GILES, OF McKEESPORT, PENNSYLVANIA.

PROCESS OF EXTRACTING TUNGSTEN AND SIMILAR METALS FROM THEIR ORES.

1,293,403.

Specification of Letters Patent.  Patented Feb. 4, 1919.

Application filed February 11, 1918. Serial No. 216,559.

*To all whom it may concern:*

Be it known that we, DAVID JOHN GILES and JAMES EARL GILES, residents of McKeesport, in the county of Allegheny and State of Pennsylvania, have invented a new and useful Improvement in Processes of Extracting Tungsten and Similar Metals from Their Ores, of which the following is a specification.

This invention relates to a process of extracting from their ores such metals as tungsten, vanadium, uranium and molybdenum. The object of the invention is to provide a process for extracting the above named metals from their ores whereby the metals can be produced in a substantially pure form and at a much lesser cost than by processes heretofore in use.

In general, the process consists in forcing a re-action between the ore and a water solution of some alkaline compound whose hydroxid radical is replaceable by the metal of the ore, thus forming an alkaline-metal solution, and thereafter treating said solution with calcium compounds, first, to precipitate the impurities as insoluble compounds, and then to precipitate the metal in the form of an insoluble calcium-metal compound.

As the alkaline compound, it is preferred to use sodium hydrate (NaOH) on account of the energy of its re-action, but other alkaline compounds can be used, such as soda ash, *i. e.* sodium carbonate, ammonium hydrate, or the like; or various potassium compounds can be used. As the calcium compounds for treating the solution, to precipitate the impurities and the metals, use is made of lime in some form, preferably milk of lime, but, if desired, calcium chlorid or any compound of the other alkaline earth metals may be used instead.

The process will be explained for the extraction of tungsten from its ore with the use of sodium hydrate as the alkaline compound and milk of lime for the precipitating agent. The re-actions for the treatment of other ores, or by the use of other re-agents, will be similar to those which will be described.

In carrying out the process the tungsten ore should be ground to a small size and then treated with a water solution of sodium hydrate preferably in a closed vessel to which heat is applied, thus generating steam in the vessel and producing a pressure and a higher temperature than can be gotten by boiling in an open vessel. Under these conditions the re-action takes place vigorously, but the same result can be obtained by boiling in an open vessel, provided more time is given and the ore is ground very fine. This step of the process can be carried out in an ordinary autoclave, but the preferred way is to crush the ore to as small a size as convenient and then charge the same, together with the sodium hydrate solution, into a closed revolving drum provided with balls or cylinders, wherein the ore is pulverized while being subjected to the foregoing action of the re-agent under steam pressure. A modified ball-mill is suitable for this purpose. In the accompanying drawing one form of mill suitable for this purpose is illustrated, Figure 1 showing the same in side elevation and Fig. 2 showing the same in part in end elevation and in part in transverse section.

The mill illustrated comprises the drum or cylinder 1 rotatably mounted on rollers or disks 2 arranged in two series, one on each side of the drum, as shown in Fig. 2, and secured to shafts 4, one of which is positively driven, such as by means of gearing 5 driven from any suitable source of power, the drum being rotated by the frictional engagement of the driven rollers or disks with collars 6 on the drum. This drum is formed of cast or other iron and is provided with cast iron or similar liners 7 which are removable to compensate for wear. In the drum are a number of balls or round rods 8 which serve to pulverize the crushed ore as the drum rotates. The drum is tightly closed and the material is charged thereinto through man-holes 9 in one of the heads thereof. Heat is applied to the drum in any suitable way, such as by means of gas burners 10 or the like. A pressure gage 11 is provided in the head to control the pressure.

Various forms of apparatus can obviously be used and that illustrated is merely one convenient form. It has been found that a short treatment of the ore in such an apparatus serves to effectively grind the ore to the proper fineness and to effect the extraction of the metal at the same time. The pressure which we prefer to maintain in the apparatus is about 60 pounds per square inch.

The treatment of the ore in the sodium hydrate solution in the closed vessel in the manner specified, i. e., under pressure and at a higher heat than can be obtained by boiling in an open vessel, accelerates the reaction whereby the hydroxid radical of the sodium hydrate is replaced by the tungsten, forming a solution of sodium tungstate, according to the following equations:

$$2NaOH + WO_3 = Na_2WO_4 + H_2O$$
$$2NaOH + SiO_2 = Na_2SiO_3 + H_2O$$

This solution is then separated from the gangue, as by decanting, but preferably by filtering. In the reaction taking place in the drum some silica and phosphorus go into solution as sodium silicate and sodium phosphate, and these must be removed if the metals are to be produced in a substantially pure form. This is done by treating the solution coming from the drum, when at a relatively low temperature, such as at room temperature, to-wit, in the neighborhood of 60 or 70 degrees Fahrenheit, by diluting to about eight-tenths ($\frac{8}{10}$) of one per cent. (1%) of sodium hydrate, and adding the calcium compound. At this temperature the milk of lime or other calcium compound can be added in excess and precipitates the phosphorus and silica as insoluble calcium compounds, but does not precipitate the tungsten or other metal. This reaction is according to the following equations:

$$Ca(OH)_2 + Na_2SiO_3 = CaSiO_3 + 2NaOH$$
$$3Ca(OH)_2 + 2Na_3PO_4 = Ca_3(PO_4)_2 + 6NaOH$$

The solution is then filtered and is again treated with the calcium compound, to-wit, the milk of lime, and its temperature is raised to approximately 200 degrees Fahrenheit, and at this higher temperature the tungsten or other metal is precipitated as insoluble calcium tungstate, which is a powder when dry. This reaction is according to the following formula:

$$Ca(OH)_2 + Na_2WO_4 = CaWO_4 + 2NaOH$$

This precipitate is separated from the liquid by decanting or filtering, and is then treated with hydrochloric acid and produces calcium chlorid and tungstic acid. This reaction is according to the following equation:

$$CaWO_4 + 2HCl = H_2WO_4 + CaCl_2$$

The so called hydrated tungstic acid is then washed, dried and reduced by means of carbon, giving metallic tungsten.

The sodium hydrate is recovered from the liquor from which the tungsten has been precipitated, by evaporating and concentrating to the strength desired, thus again producing a sodium hydrate solution which can be used to treat a fresh batch of ore.

Likewise, the calcium chlorid which is produced by treating the calcium tungstate with the hydrochloric acid, is also a by-product which can be sold as a separate product or used in place of the milk of lime to precipitate the tungsten from the solution of sodium tungstate, according to the following equation:

$$CaCl_2 + Na_2WO_4 = CaWO_4 + 2NaCl.$$

The process is very economical. Practically all of the re-agents are recovered, and the process can be carried out expeditiously and by use of very simple and easily procured apparatus. The process of extracting the metal from the ore is alkaline throughout and hence unprotected iron or steel apparatus can be used. It requires no jigging or other concentration of the ores before treatment and is applicable to all kinds of ores of the metals specified, even very low grade ore.

Among the tungsten ores to which it is applicable are ferberite, i. e. iron tungstate, hübnerite, i. e. manganese tungstate, wolframite, which is a mixture of manganese tungstate and iron tungstate, scheelite, i. e. calcium tungstate, as well as to practically all of the ores of vanadium, uranium and molybdenum.

What we claim is:—

1. The process of extracting metals of the character specified from their ores and purifying the same, which consists in treating the ore with a solution of an alkaline compound, thereby replacing the hydroxid radical of the alkaline compound by the metal of the ore, then diluting the solution and adding to it at a relatively low temperature a calcium compound, thereby precipitating insoluble calcium compounds of silica and phosphorus, and adding to the residual liquor at a higher temperature a calcium compound, thereby precipitating an insoluble calcium-metal compound.

2. The process of extracting metals of the character specified from their ores and purifying the same, which consists in treating the ore with a solution of sodium hydrate, thereby forming a sodium compound of the metal of the ore, then diluting the solution and adding to it at a relatively low temperature a calcium compound, thereby precipitating insoluble calcium compounds of silica and phosphorus, and adding to the residual liquor at a higher temperature a calcium compound, thereby precipitating an insoluble calcium-metal compound.

3. The process of extracting tungsten from its ores and purifying the same, which consists in treating the ore with a solution of an alkaline compound while under pressure, thereby replacing the hydroxid radical of the alkaline compound by the metal of the ore, forming an alkaline tungstate, then diluting the solution and adding to it at a relatively low temperature a calcium compound and thereby precipitating insoluble calcium compounds of silica and phosphorus, and adding to the residual alkaline tungstate solution at a higher temperature a calcium compound, thereby precipitating insoluble calcium tungstate.

4. The process of extracting tungsten from its ores and purifying the same, which consists in treating the ore with a solution of sodium hydrate, thereby forming soluble sodium tungstate, diluting said solution and adding thereto at a relatively low temperature a calcium compound, thereby precipitating insoluble calcium compounds of silica and phosphorus, and adding to the residual sodium tungstate solution at a higher temperature a calcium compound, thereby precipitating insoluble calcium tungstate.

5. The process of extracting metals of the character specified from their ores, which consists in heating the ore in a solution of alkaline compound while under pressure, thereby replacing the hydroxid radical of the alkaline compound by the metal of the ore, separating the solution from the gangue, diluting the solution and adding thereto at a relatively low temperature a calcium compound, thereby precipitating insoluble calcium compounds of silica and phosphorus, and then adding to the residual alkaline-metal solution at a higher temperature a calcium compound, thereby forming an insoluble calcium-metal compound as a precipitate.

6. The process of extracting metals of the character specified from their ores, which consists in heating the ore under pressure in a solution of sodium hydrate, thereby replacing the hydroxid radical of the sodium hydrate by the metal of the ore, separating the solution from the gangue, diluting the solution and adding thereto at a relatively low temperature a calcium compound, thereby precipitating insoluble calcium compounds of silica and phosphorus, and adding to the residual alkaline-metal solution at a higher temperature a calcium compound, thereby forming an insoluble calcium-metal compound as a precipitate.

7. The process of extracting tungsten from its ore, which consists in heating the tungsten ore in a solution of an alkaline compound while under pressure, thereby replacing the hydroxid radical of the alkaline compound by the metal of the ore, forming alkaline tungstate, separating the solution from the gangue, diluting the solution and adding to it at a relatively low temperature a calcium compound and thereby precipitating insoluble calcium compounds of silica and phosphorus, and adding to the residual alkaline-metal solution at a higher temperature a calcium compound, thereby forming insoluble calcium tungstate as a precipitate.

8. The process of extracting tungsten from its ore, which consists in heating the ore in a solution of sodium hydrate under pressure, thereby forming sodium tungstate, separating the soluble sodium tungstate solution from the gangue, diluting the solution and adding to it at a relatively low temperature a calcium compound, thereby precipitating insoluble calcium compounds of silica and phosphorus, and adding to the residual alkaline-metal solution at a higher temperature a calcium compound, thereby forming insoluble calcium tungstate as a precipitate.

In testimony whereof, we have hereunto set our hands.

DAVID JOHN GILES.
JAMES EARL GILES.

Witness:
  CARL F. MORLOCK.